(12) United States Patent
Hannah

(10) Patent No.: US 6,974,927 B2
(45) Date of Patent: Dec. 13, 2005

(54) METHOD AND SYSTEM FOR OPTICALLY SORTING AND/OR MANIPULATING CARBON NANOTUBES

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 10/783,145

(22) Filed: Feb. 19, 2004

(65) Prior Publication Data

US 2005/0218045 A1    Oct. 6, 2005

Related U.S. Application Data

(62) Division of application No. 10/107,833, filed on Mar. 26, 2002, now Pat. No. 6,774,333.

(51) Int. Cl.[7] .............................................. B03C 7/00
(52) U.S. Cl. .............................. 209/129; 209/1; 977/1
(58) Field of Search ........................... 209/1, 129, 576, 209/579, 585, 586; 356/309, 311; 977/1

(56) References Cited

U.S. PATENT DOCUMENTS

| | | | |
|---|---|---|---|
| 5,245,466 A * | 9/1993 | Burns et al. ................. 359/296 |
| 6,331,690 B1 | 12/2001 | Yudasaka et al. | |
| 6,333,016 B1 | 12/2001 | Resasco et al. | |
| 6,350,488 B1 | 2/2002 | Lee et al. | |
| 6,529,277 B1 * | 3/2003 | Weitekamp .................. 356/445 |
| 2003/0168385 A1 * | 9/2003 | Papadimitrakopoulos ...... 209/1 |
| 2004/0040834 A1 * | 3/2004 | Smalley et al. ............. 204/164 |
| 2005/0122550 A1 * | 6/2005 | Plewa et al. .................. 359/10 |

OTHER PUBLICATIONS

Kawata et al., Movement of micrometer-sized particles in the evanescent field of a laser beam, Optics Letters, vol. 17, No. 11, Jun. 1, 1992.*

(Continued)

*Primary Examiner*—Donald P. Walsh
*Assistant Examiner*—Joseph Rodriguez
(74) *Attorney, Agent, or Firm*—DLA Piper Rudnick Gray Cary US LLP

(57) ABSTRACT

A method, apparatus, and system for optically sorting and/or manipulating carbon nanotubes by creating an optical dipole trap with a focused light source (e.g., a laser) are described in detail herein. In one representative embodiment, light from the light source may be directed onto a mixture of carbon nanotubes, the mixture including a target class of carbon nanotubes having dimensions (e.g., length and diameter) corresponding to particular electronic properties suitable for an application. By identifying a resonant condition corresponding to the target class of carbon nanotubes, and tuning the light source substantially to the resonant condition, an optical dipole trap may be created to attract carbon nanotubes of the target class to allow manipulation and/or sorting of the target class of carbon nanotubes from the mixture, or rotation of the nanotubes via rotation of a plane of polarization of the light, in an embodiment.

12 Claims, 4 Drawing Sheets

OTHER PUBLICATIONS

Plewa et al., Processing carbon nanotubes with holographic optical tweezers, Optics Express, vol 12, No. 9, May 3, 2004.*

Tang, X.-P. et al.; Electronic Structures of Single-Walled Carbon Nanotubes Determined by NMR; Science, Apr. 2000 pp. 492-494 vol. 288.

Andrews, R. et al.; Continuous Production of Aligned Carbon Nanotubes: A Step Closer to Commercial Realization; Chemical Physics Letters, 303 (1999) 467-474.

Kuhr, Stefan et al.; Deterministic Delivery of a Single Atom; Science, Jul. 2001, pp. 278-280, vol. 293.

Wildöer, Jeroen W. G. et al.; Electronic Structure of Atomically Resoved Carbon Nanotubes; Nature, Jan. 1998, pp. 59-62, vol. 391.

Journet, C. et al.; Large-Scale Production of Single-Walled Carbon Nanotubes by the Electric-Arc Technique; Nature, Aug. 1997, pp. 756-758, vol. 388.

Venema, Liesbeth C. et al.; Imaging Electron Wave Functions of Quanitzed Energy Levels in Carbon Nanotubes; Science, Jan. 1999, pp. 52-55, vol. 283.

Han, H.X. et al.; Photoluminescence Study of Carbon Nanotubes; Los Alamos Physics Preprints: cond-mat/0004035, Apr. 2000, 6 Pgs.

Rochefort, Alain et al.; The Effects of Finite Length on the Electronic Structure of Carbon Nanotubes; Los Alamos Physics Preprints: cond-mat/9808271, Aug. 1998, 18 pgs.

* cited by examiner

METHOD AND SYSTEM FOR OPTICALLY SORTING AND/OR MANIPULATING CARBON NANOTUBES

CROSS REFERENCE TO RELATED APPLICATIONS

This application is a divisional application of U.S. Ser. No. 10/107,833, filed Mar. 26, 2002, now U.S. Pat. No. 6,774,333 issued Aug. 10, 2004. The disclosure of the prior application is considered part of and is incorporated by reference in the disclosure of this application.

TECHNICAL FIELD

This disclosure relates generally to carbon nanotube technology, and more particularly, but not exclusively, to a method, apparatus, and system for optically sorting and/or manipulating a target class of carbon nanotubes via exploitation of electronic properties correlative to dimensions of the carbon nanotubes.

BACKGROUND INFORMATION

Carbon nanotubes have evoked considerable interest since their discovery in the early 1990s. Potential uses include everything from transistors, digital memory, and miniature electron emitters for displays, to hydrogen gas storage devices for the next generation of environmentally-friendly automobiles.

With mechanical strengths up to 100 times that of steel, carbon nanotubes are structurally seamless cylindrical tubes of graphite sheets. The basic repeating unit of the graphite sheet comprises hexagonal rings of carbon atoms, with a carbon-carbon bond length of about 1.42 Å. Carbon nanotubes may be capped with a fullerene hemisphere, and, depending on the method of synthesis, may comprise multi-walled or single-walled tubes. A single-walled carbon nanotube comprises a tube, the wall of which is only a single atom thick. Multi-walled carbon nanotubes comprise a collection of tubes, stuffed one within another in a nested configuration. A typical single-walled carbon nanotube ("SWNT") may have a diameter varying from about 1 nanometer ("nm") to about 5 nm, and a length of up to a few millimeters. Generally, SWNTs are preferred over multi-walled carbon nanotubes for use in applications because they have fewer defects and are therefore stronger and more conductive than multi-walled carbon nanotubes having similar dimensions.

The structural characteristics of carbon nanotubes impart unique physical properties that make nanotubes suitable for a variety of applications. For instance, carbon nanotubes may exhibit electrical characteristics of metals or semiconductors, depending on the degree of chirality or twist of the tube. Different chiral forms of carbon nanotubes are referred to as armchair and zigzag, for example. The electronic properties exhibited by carbon nanotubes are determined in part by the diameter and length of the tube. Utilization of carbon nanotubes having particular electronic properties may be aided by a mechanism for producing or selecting nanotubes of specified dimensions.

Existing carbon nanotube synthesis techniques include arc discharge, gas phase synthesis, laser ablation of carbon, and the chemical vapor deposition of hydrocarbons. The arc discharge method is generally not able to control the diameter or length of carbon nanotubes. Meanwhile, the gas phase synthesis method, while appropriate for mass synthesis of carbon nanotubes, also has difficulty in controlling the diameter and length of the carbon nanotubes produced therefrom. While the laser ablation method, and the chemical vapor deposition method generally yield more uniform carbon nanotube products, no adequate mechanism exists for selectively synthesizing carbon nanotubes of specified dimensions.

Known selection and/or sorting techniques for carbon nanotubes having specified dimensions have also proven problematic. While an atomic force microscope or scanning tunneling microscope may be used to select and/or precisely measure the geometry of individual nanotubes, sorting large numbers of nanotubes via these instruments may be both time consuming and cumbersome. As applications for carbon nanotubes become more sophisticated, mechanisms for selectively manipulating carbon nanotubes of specified dimensions become an increasingly integral element of device construction.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of a method, apparatus, and system for optically sorting and/or manipulating carbon nanotubes are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, apparatus, and system for optically sorting and/or manipulating carbon nanotubes by creating an optical dipole trap with a focused light source (e.g., a laser). In one representative embodiment, light from the light source may be directed onto a mixture of carbon nanotubes, the mixture including a target class of carbon nanotubes having dimensions (e.g., length and diameter) corresponding to particular electronic properties suitable for an application. By identifying a resonant condition corresponding to the target class of carbon nanotubes, and tuning the light source substantially to the resonant condition, an optical dipole trap may be created to attract carbon nanotubes of the target class to allow manipulation and/or sorting of the target class of carbon nanotubes from the mixture, in an embodiment. Other features of the illustrated embodiments will be apparent to the reader from the foregoing and the appended claims, and as the detailed description and discussion is read in conjunction with the accompanying drawings.

Figure 1:
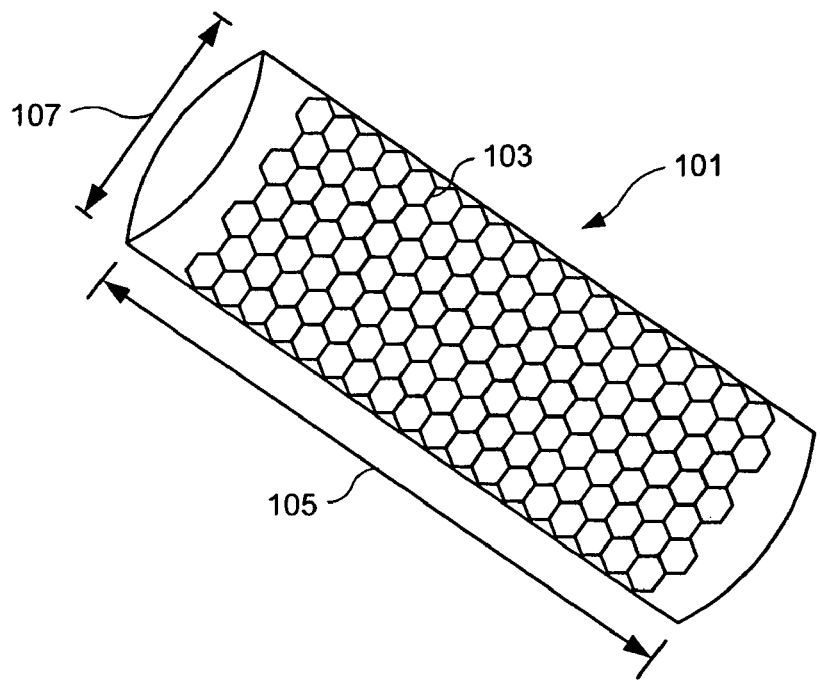
FIG. 1 is a pictorial illustration of a carbon nanotube in accordance with an embodiment of the present invention.

With reference now to the drawings, and in particular to FIG. 1, a pictorial illustration of an embodiment of a carbon nanotube 101 is shown in accordance with an embodiment of the present invention. It will be appreciated that the figures referenced and described herein are intended for illustrative purposes only, and are not necessarily drawn to scale. The carbon nanotube 101 comprises a plurality of carbon atoms bonded together to form a cylindrical tube comprised of a lattice of hexagons 103, and having a length 105 and a diameter 107, in an embodiment.

Carbon nanotubes (e.g., the carbon nanotube 101) have strong electronic properties that are modulated by the length (e.g., the length 105) and the diameter (e.g., the diameter 107) of the tube. The dimension dependence of the electronic properties results from the one-dimensional form of the tube, which is an approximate model of a quantum mechanical system. Electrons in these cylindrical tubes are confined in the radial and circumferential directions, and can only propagate along the longitudinal axis of the tube. The sensitivity of the electronic wavefunction to length may be illustrated, in an embodiment, by a simple estimate for the energy level splitting ($\Delta E$) of a tube of length L:

$$\Delta E = h v_F / 2L$$

where h is Planck's constant and $v_F$ is the Fermi velocity ($8.1 \times 10^5$ m/s). For example, a nanotube of 30 nm in length may have an estimated energy level splitting of 0.06 eV. As will be appreciated, the difference between electron energy levels is inversely proportional to the length of the nanotube, with finer splitting observed for longer tubes.

Figure 2A:
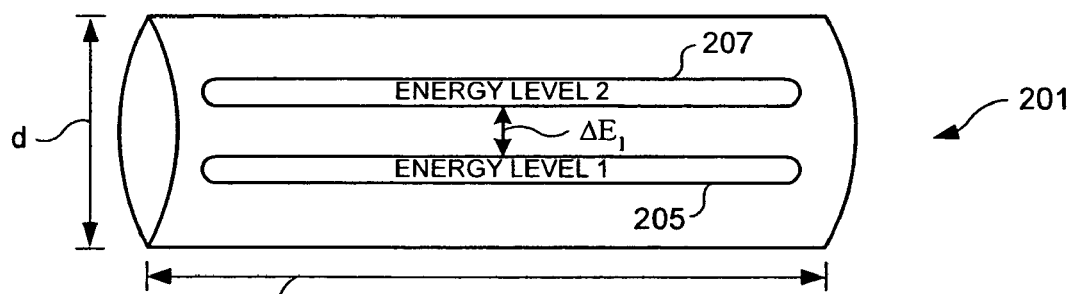
FIGS. 2A and 2B are pictorial illustrations of two example carbon nanotubes showing a difference between a pair of energy levels in accordance with an embodiment of the present invention.
Figure 2B:

With reference now primarily to FIGS. 2A and 2B, pictorial representations of two example carbon nanotubes 201 and 203, respectively, illustrating the dependence of energy level splitting on tube length, are shown in accordance with an embodiment of the present invention. FIG. 2A depicts a carbon nanotube 201 having a diameter d and a length $L_1$. The carbon nanotube 201 includes, in an embodiment, a first energy level 205 and a second energy level 207 separated by an energy level splitting $\Delta E_1$. FIG. 2B depicts a carbon nanotube 203 having a diameter d and a length $L_2$. The carbon nanotube 203 includes, in an embodiment, a first energy level 209 and a second energy level 211 separated by an energy level splitting $\Delta E_2$. As will be appreciated with reference to FIGS. 2A and 2B, $L_1 > L_2$, and consequently, $\Delta E_1 < \Delta E_2$.

The electronic properties of carbon nanotubes are also a function of tube diameter. For example, the relationship between the fundamental energy gap ($E_{gap}$) (highest occupied molecular orbital—lowest unoccupied molecular orbital) and tube diameter may be modeled, in an embodiment, by the following function:

$$E_{gap} = 2 y_0 a_{cc} / d$$

where $y_0$ is the carbon-carbon tight bonding overlap energy (2.7±0.1 eV), $a_{cc}$ is the nearest neighbor carbon-carbon distance (0.142 nm), and d is the tube diameter.

Upon excitation by light, for example a laser, or the like, electrons are excited into higher energy states. At around 2 eV, carbon nanotubes undergo strong absorption/emission of light with a series of sharp resonant peaks determined by both the diameter and length of the tube, as described above. Because the quantized energy levels of the carbon nanotubes are dependant on the dimensions of the tube, nanotubes of different dimensions will absorb light of different wavelengths, thereby resulting in an alteration in the electron distribution within the nanotube, and a corresponding change in the molecular dipole moment. By exploiting these electronic characteristics of the nanotubes, an embodiment of the present invention provides selective manipulation and/or sorting of the tubes via a tuned light source.

Optical dipole traps are based on the interaction between an electric field component of light E, and an induced electric dipole moment $d_m$, which is proportional to E. An interaction energy U is proportional to a local light intensity, and may be determined, in an embodiment, by the following relationship:

$$U = -(d_m \cdot E)/2$$

In a carbon nanotube, the molecular dipole moment may be oriented along the longitudinal axis of the nanotube, resulting from the electronic standing waves formed along the tube. Thus, it will be appreciated that by tuning a light source, such as a laser, to the specific resonant condition corresponding to the diameter and length of a particular target class of carbon nanotubes (e.g., having particular dimensions), carbon nanotubes of the target class may be attracted to the region of maximum intensity, allowing the tubes to be manipulated and/or sorted, in an embodiment.

Figure 3:
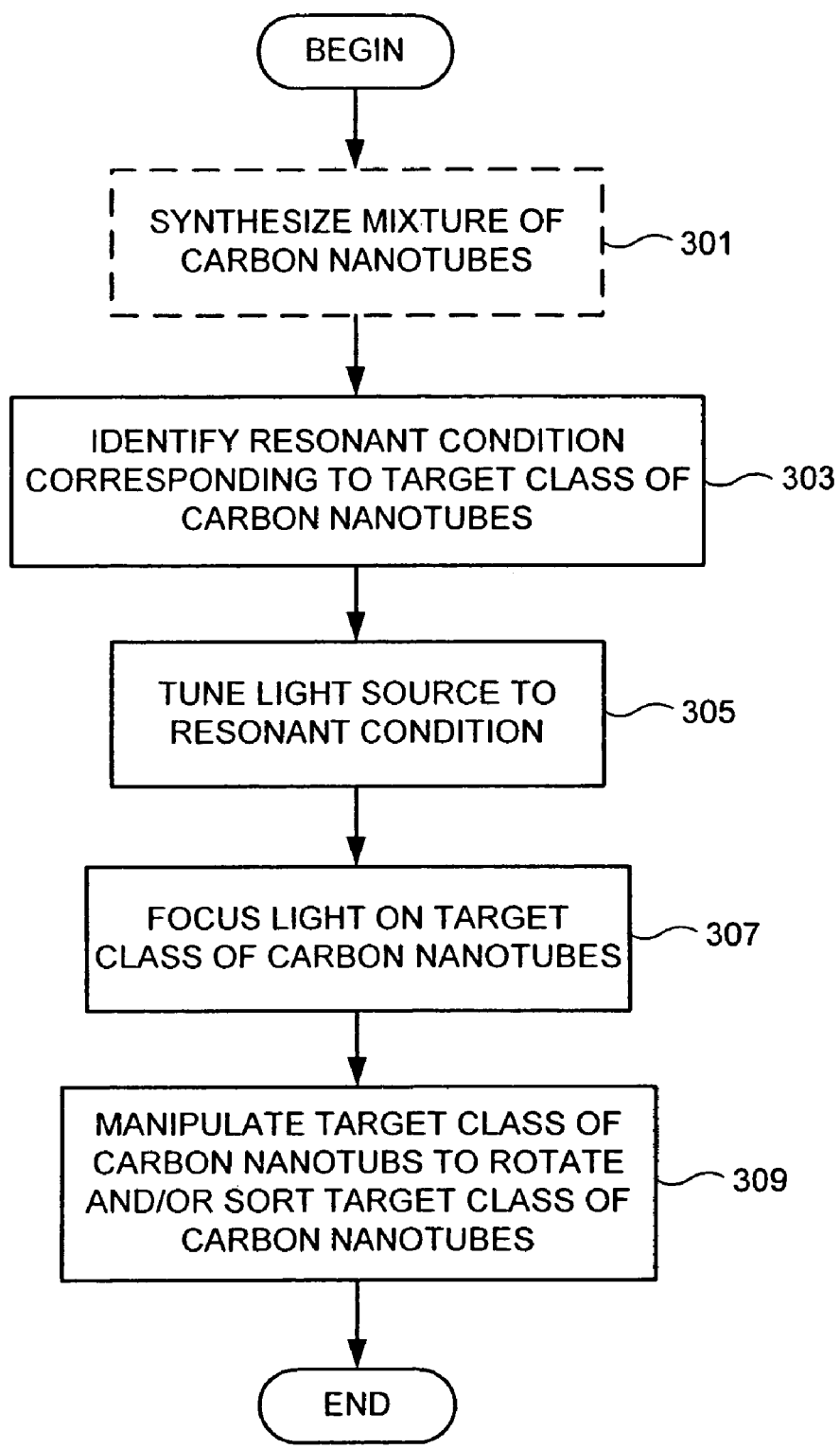
FIG. 3 is a flow diagram illustrating an embodiment of a flow of events in a process in accordance with an embodiment of the present invention.

With reference now primarily to FIG. 3, a flow diagram illustrating an embodiment of a flow of events in a process is shown in accordance with an embodiment of the present invention. As the following discussion proceeds with regard to FIG. 3, reference is made to FIGS. 4–7 to illustrate various aspects of embodiments of the invention.

In the illustrated embodiment of FIG. 3, the process begins with the synthesis of a mixture of carbon nanotubes (see, e.g., process block 301). It will be appreciated that process block 301 is illustrated with broken lines to indicate that this portion of the process need not necessarily be included in all embodiments of the present invention. For example, in one embodiment, the synthesis of carbon nanotubes may comprise a completely separate process, the product of which may comprise an input to the remainder of the process illustrated in FIG. 3. In various embodiments, the mixture of carbon nanotubes of varying length and/or diameter may be produced by a variety of techniques known in the art, including but not limited to carbon-arc discharge, chemical vapor deposition, plasma assisted chemical vapor deposition, laser ablation of a catalytic metal-containing graphite target, condensed phase electrolysis, or the like.

The process illustrated in FIG. 3 next proceeds, in an embodiment, to identify a resonant condition corresponding to a target class of carbon nanotubes (see, e.g., process block 303). For example, the target class of carbon nanotubes may comprise those nanotubes having a particular length and/or diameter that may be suitable for a particular application. In one embodiment, identifying the resonant condition may include examining at least one carbon nanotube to identify at least one dimension corresponding to the target class of carbon nanotubes. In one embodiment, the at least one dimension may comprise a length or a diameter, as discussed above. Examining the at least one carbon nanotube may comprise, in an embodiment, selecting a series of nanotubes and observing and/or measuring the dimensions of the selected series of nanotubes via scanning tunneling microscopy, or the like. After identifying a carbon nanotube having the desired dimensions (e.g., corresponding to the target class) via examination, as described above, identifying the resonant condition corresponding to the target class of carbon nanotubes may also include, in an embodiment, exposing the carbon nanotube having the at least one dimension (e.g., corresponding to the target class) to a variable light source to identify a wavelength of light capable to create the optical dipole trap corresponding to the target class of carbon nanotubes. For example, an operator may scan through a series of wavelengths with the light substantially focused on the carbon nanotube until an optical dipole trap is observed (i.e., the carbon nanotube is visibly attracted to the light).

In another embodiment, identifying the resonant condition corresponding to the target class of carbon nanotubes may include examining the at least one carbon nanotube to identify at least one dimension corresponding to the target class of carbon nanotubes, as discussed above. Following the foregoing examination, a calculation of the resonant condition may be undertaken via quantum mechanical principles, based on the dimensions of the nanotube, which would be familiar to those having skill in the art.

With continued reference to FIG. 3, the process next proceeds, in an embodiment, to tune the light source substantially to the resonant condition (see, e.g., process block 305) (e.g., the wavelength capable to create the optical dipole trap corresponding to the target class of carbon nanotubes), and to direct light, emitted by the light source, onto at least one nanotube of the target class of carbon nanotubes to create the optical dipole trap (see, e.g., process block 307). Directing the light to create the optical dipole trap may then allow manipulation of the at least one nanotube via the light to rotate the at least one nanotube and/or sort the at least one nanotube from the mixture (see, e.g., process block 309), in an embodiment.

Figure 4:
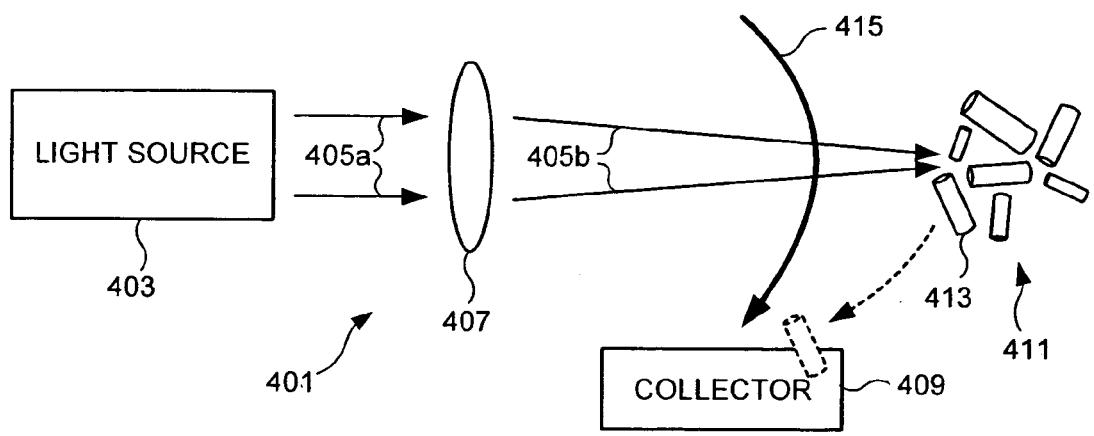
FIG. 4 is a pictorial illustration of an embodiment of an apparatus for manipulating carbon nanotubes via light in accordance with an embodiment of the present invention.

With reference now primarily to FIG. 4, an embodiment of an apparatus 401 for manipulating carbon nanotubes via light is shown in accordance with an embodiment of the present invention. In one embodiment, the apparatus 401 includes a light source 403, for example a laser, to emit light 405a. As will be appreciated, the wavelength of the light 405a may be tuned to correspond substantially to the resonant condition of the target class of carbon nanotubes, as discussed above in conjunction with process block 303 (FIG. 3). The apparatus 401 may also include, in an embodiment, focusing optics 407, such as for example a lens, optically coupled to the light source 403 and configured to direct the light 405b onto at least one carbon nanotube of the target class of carbon nanotubes 413. The at least one carbon nanotube of the target class of carbon nanotubes 413 may, in an embodiment, comprise a portion of a mixture of carbon nanotubes 411. It will be appreciated that in one embodiment, the focusing optics 407 may comprise an element of the light source 403, and need not be provided separately as illustrated in FIG. 4.

In one embodiment, the apparatus 401 may also include a collector 409 positioned to accumulate the target class of carbon nanotubes (e.g., the carbon nanotube 413) in response to manipulation of the tubes with the light. For example, in one embodiment, the apparatus 401, including the light source 403 and the focusing optics 407, may be configured to scan the light 405b across the mixture of carbon nanotubes 411, as indicated by the arrow having reference numeral 415. In this manner, carbon nanotubes of the target class (e.g., the carbon nanotube 413) may be manipulated to, for example, sort the target class of carbon nanotubes (see, e.g., the carbon nanotube 413) from the mixture of carbon nanotubes 411 having varying lengths and/or diameters.

Figure 5:
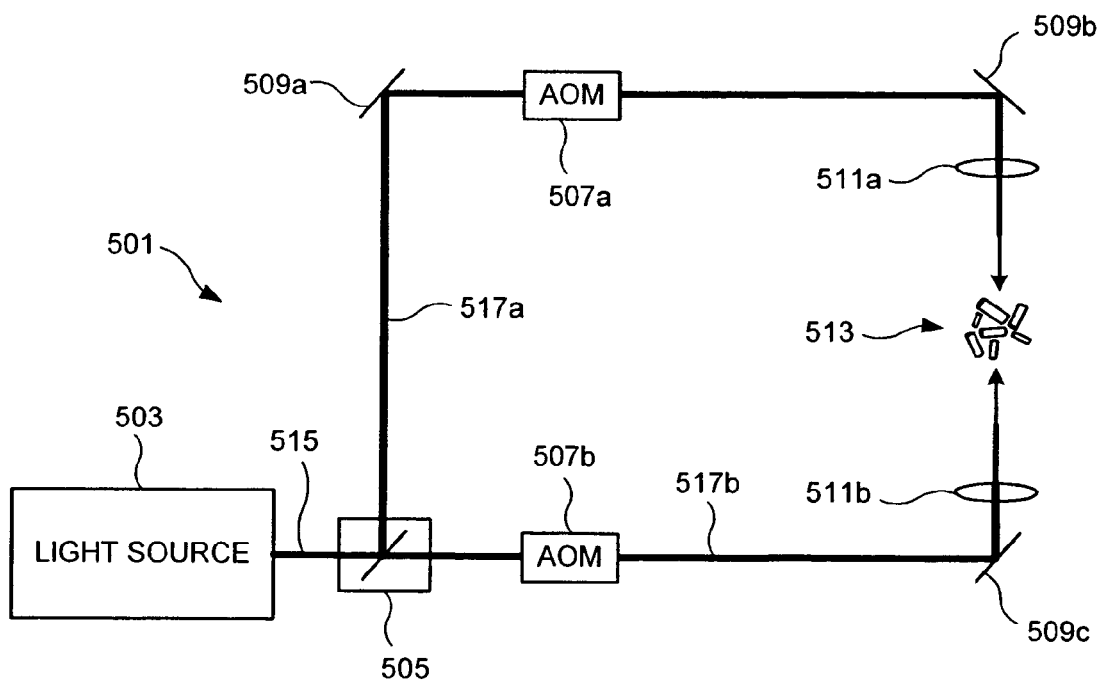
FIG. 5 is a pictorial illustration of another embodiment of an apparatus for manipulating carbon nanotubes via light in accordance with an embodiment of the present invention.

With reference now primarily to FIG. 5, a pictorial illustration of another embodiment of an apparatus 501 for manipulating carbon nanotubes via light is shown in accordance with an embodiment of the present invention. In the illustrated embodiment, the apparatus 501 includes a light source 503 that may be tuned substantially to the resonant condition corresponding to the target class of carbon nanotubes, as discussed above. In addition, the apparatus 501 may include a beam splitter 505, optically coupled to the light source 503 to split light 515 emitted from the light source 503 along a first optical path 517a and a second optical path 517b. Light propagating along the first optical path 517a may be re-directed by a first mirror 509a.

In one embodiment, the apparatus 501 may also include a first acousto-optic modulator 507a and second acousto-optic modulator 507b, optically coupled to the light source 503, and positioned to control the frequency of the light propagating along the first and second optical paths 517a and 517b, respectively. In one embodiment, the first and second acousto-optic modulators 507a and 507b may be configured to heterodyne the frequency of the light propagating along the first and second optical paths 517a and 517b, respectively. The light propagating along the first and second optical paths 517a and 517b may then be reflected from a second mirror 509b and a third mirror 509c, respectively, toward focusing optics 511a and 511b, respectively, in an embodiment. The focusing optics 511a and 511b may each comprise a lens, in an embodiment, and may be configured to direct the light propagating along the first and second optical paths 517a and 517b onto at least one nanotube of the target class of carbon nanotubes (e.g., within a mixture of carbon nanotubes 513) to create an optical dipole trap capable to attract the at least one nanotube.

By sweeping the frequency of the light via one of the acousto-optic modulators 507a and 507b in a phase-continuous way, an interference pattern may be moved in one or the other direction between the focusing optics, thereby creating a "conveyor belt" along which nanotubes of the target class of carbon nanotubes may be moved to separate them from the mixture of carbon nanotubes 513 having varying lengths and/or diameters, in one embodiment.

In addition to sorting the target class of carbon nanotubes, manipulating the at least one carbon nanotube via the light may, in an embodiment, comprise rotating the at least one carbon nanotube via rotation of a plane of polarization of the light. Carbon nanotubes in resonance with the light (e.g., the light 405b, FIG. 4) emitted from the light source (e.g., the light source 403, FIG. 4) may align a longitudinal axis of the tube parallel to the plane of polarization of an electric field component of the light, in one embodiment.

Figure 6:
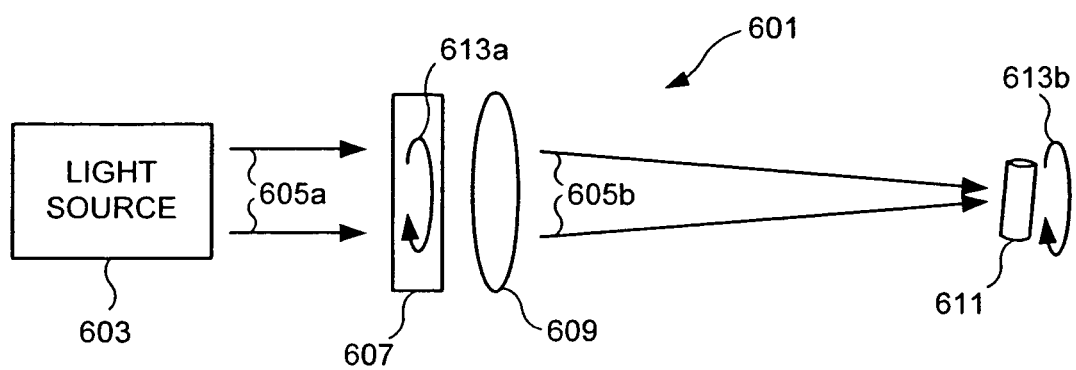
FIG. 6 is a pictorial illustration of yet another embodiment of an apparatus for manipulating carbon nanotubes via light in accordance with an embodiment of the present invention.

With reference now primarily to FIG. 6, a pictorial illustration of yet another embodiment of an apparatus 601 for manipulating carbon nanotubes via light is shown in accordance with an embodiment of the present invention. In the illustrated embodiment, the apparatus 601 includes a light source 603 capable to generate light 605a tuned to the resonant condition of the target class of carbon nanotubes, as discussed above. In addition, the apparatus 601 may also include, in an embodiment, a polarizer 607, optically coupled to the light source 603 and capable to rotate the plane of polarization of the light 605a. The apparatus 601 may also comprise, in an embodiment, focusing optics 609, such as a lens, to direct the light 605b, emitted by the light source 603 and polarized by the polarizer 607 onto at least one nanotube 611 of the target class of carbon nanotubes to create an optical dipole trap capable to attract the at least one nanotube 611. By rotating the plane of polarization of the light 605a with the polarizer 607, the at least one nanotube 611 may be rotated accordingly, as described above, and indicated by the arrows having reference numerals 613a and 613b, respectively.

Figure 7:
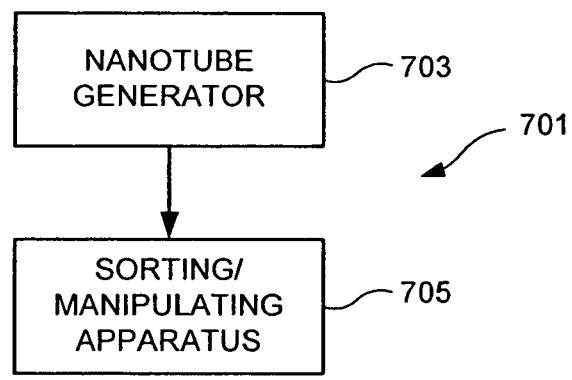
FIG. 7 is a block diagram illustrating an embodiment of a system for generating, and manipulating and/or sorting carbon nanotubes in accordance with an embodiment of the present invention.

With reference now primarily to FIG. 7, a block diagram illustrating an embodiment of a system 701 for generating, and manipulating and/or sorting carbon nanotubes is shown in accordance with an embodiment of the present invention. The system may comprise, in an embodiment, a nanotube generator 703 and a sorting/manipulating apparatus 705, such as those illustrated in FIGS. 4–6, and described herein. In one embodiment, the nanotube generator 703 may be configured to synthesize a plurality of carbon nanotubes via any one of the techniques know in the art, or a combination thereof. The plurality of carbon nanotubes may each have a length and a diameter, and among the plurality of carbon nanotubes synthesized by the nanotube generator 703, the length and/or diameter of the tubes may vary according to the technique and/or parameters used to produce the nanotubes, in an embodiment.

In one embodiment, the sorting/manipulating apparatus 705 may receive the nanotubes produced by the nanotube generator 703, and may be configured to sort the plurality of carbon nanotubes according to at least one of the length or the diameter of the tubes. For example, in one embodiment the apparatus may comprise a light source, such as those described above in conjunction with FIGS. 4–6, tuned substantially to a resonant condition corresponding to the target class of carbon nanotubes. The target class of carbon nanotubes may, in an embodiment, comprise at least a portion of the plurality of carbon nanotubes produced by the nanotube generator 703. In addition to the light source, the sorting/manipulating apparatus 705 may also include, in an embodiment, focusing optics, such as those described above in conjunction with FIGS. 4–6, configured to direct light, emitted by the light source, onto at least one nanotube of the target class of carbon nanotubes to create an optical dipole trap capable to attract the at least one nanotube.

As will be appreciated, the light source of the sorting/manipulating apparatus 705 may comprise a laser, and the focusing optics may comprise at least one lens, in an embodiment. In one embodiment, the sorting/manipulating apparatus 705 may also include a collector, such as that described above in conjunction with FIG. 4, positioned to accumulate the target class of carbon nanotubes in response to manipulation with the light. In still another embodiment, the sorting/manipulating apparatus 705 may include a polarizer, optically coupled to the light source, to rotate a plane of polarization of the light to rotate the at least one nanotube, the at least one nanotube having a longitudinal axis aligned parallel to the plane of polarization.

In one embodiment, the sorting/manipulating apparatus 705 may be configured to scan the light, emitted by the light source, across a mixture of carbon nanotubes (e.g. the plurality of carbon nanotubes produced by the nanotube generator 703) to create an optical dipole trap to attract nanotubes of the target class to allow sorting and/or other manipulation. The mixture may, in an embodiment, comprise a dispersion of carbon nanotubes in a medium, as will be familiar to those skilled in the art.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A system, comprising:
   a carbon nanotube generator configured to synthesize a plurality of carbon nanotubes, each of the plurality of carbon nanotubes having a length and a diameter; and
   an apparatus configured to sort the plurality of carbon nanotubes according to at least one of the length or the diameter, the apparatus comprising:
      a light source tuned substantially to a resonant condition corresponding to a target class of carbon nanotubes, the target class of carbon nanotubes comprising at least a portion of the plurality of carbon nanotubes; and
      focusing optics configured to direct light, emitted by the light source, onto at least one nanotube of the target class of carbon nanotubes to create an optical dipole trap, the optical dipole trap capable to attract the at least one nanotube.

2. The system of claim 1, wherein the apparatus is configured to scan the light across a mixture of carbon nanotubes, the mixture of carbon nanotubes including the target class of carbon nanotubes.

3. The system of claim 1, wherein the light source comprises a laser.

4. The system of claim 1, wherein the focusing optics include at least one lens.

5. The system of claim 1, wherein the apparatus further comprises a collector positioned to accumulate the target class of carbon nanotubes in response to manipulation by the light.

6. The system of claim 1, wherein the apparatus further comprises a polarizer, optically coupled to the light source.

7. The system of claim 6, wherein the polarizer is configured to rotate a plan of polarization of the light to rotate the at least one nanotube, the at least one nanotube having a longitudinal axis aligned parallel to the plane of polarization.

8. A method, comprising:
  synthesizing a plurality of carbon nanotubes to generate a mixture of carbon nanotubes, each of the plurality of carbon nanotubes having a length and a diameter; and
  sorting the mixture of carbon nanotubes according to at least one of the length or the diameter, sorting the mixture, comprising:
    identifying a resonant condition corresponding to a target class of carbon nanotubes;
    tuning a light source substantially to the resonant condition;
    directing light, emitted by the light source, onto at least one nanotube of the target class of carbon nanotubes to create an optical dipole trap; and
    manipulating the at least one nanotube via the light.

9. The method of claim 8, wherein identifying the resonant condition includes:
  examining at least one carbon nanotube to identify at least one of the length or the diameter corresponding to the target class of carbon nanotubes; and
  exposing a carbon nanotube having the at least one dimension to a variable light source to identify a wavelength of light capable to create the optical dipole trap corresponding to the target class of carbon nanotubes.

10. The method of claim 8, wherein the light source comprises a laser.

11. The method of claim 8, wherein directing light, emitted by the light source, onto the at last one nanotube includes scanning the light across the mixture of carbon nanotubes, the target class of carbon nanotubes comprising a portion of the mixture.

12. The method of claim 11, wherein the mixture of carbon nanotubes comprises a dispersion of carbon nanotubes in a medium.

* * * * *